United States Patent [19]

Lu

[11] 4,161,454

[45] Jul. 17, 1979

[54] COATING MAGNETITE WITH POLYACID

[75] Inventor: Chin H. Lu, Webster, N.Y.

[73] Assignee: Xerox Corporation, Stamford, Conn.

[21] Appl. No.: 802,604

[22] Filed: Jun. 2, 1977

[51] Int. Cl.[2] .......................... G03G 9/08; B32B 5/16; B32B 15/08

[52] U.S. Cl. ............................ 252/62.1 P; 252/62.54; 427/127; 427/215; 427/221; 428/407

[58] Field of Search ............... 427/216, 220, 221, 127, 427/215; 428/403, 407; 252/62.1 P, 62.1 PM, 62.54; 260/42.14

[56] References Cited

U.S. PATENT DOCUMENTS

| | | | |
|---|---|---|---|
| 3,041,289 | 6/1962 | Katchen et al. | 252/62.54 |
| 3,221,315 | 11/1965 | Brown et al. | 252/62.54 |
| 3,795,618 | 3/1974 | Kasper | 252/62.1 P |
| 4,097,620 | 6/1978 | Lu | 427/220 |

*Primary Examiner*—Ronald H. Smith
*Assistant Examiner*—Stuart D. Frenkel

[57] ABSTRACT

A method of coating pigment particles such as magnetite with a derivative of a maleic anhydride. The magnetite pigments coated by this process are found to be particularly suitable for use in formation of magnetic toners that will both develop inductively and transfer electrostatically.

17 Claims, No Drawings

COATING MAGNETITE WITH POLYACID

BACKGROUND OF THE INVENTION

This invention relates to electrophotographic development utilizing magnetic toner particles which are applied from magnetic brush to the electrostatic latent image without use of a carrier material.

There have been suggested systems for magnetic development not utilizing the carrier material. One such system was described in U.S. Pat. No. 2,846,333 to Wilson. Wilson et al, disclosed the use of magnetic brush to apply toner particles formed of ferrites and resin material to develop electrostatic latent images. The difficulty with this process was the conductivity of the toner made electrostatic transfer difficult.

A further development of magnetic development without carriers is illustrated by Kotz, U.S. Pat. No. 3,909,258 wherein an electrostatic development process utilizing a magnetic brush without carrier is illustrated. A toner suitable for use in the Kotz process is disclosed in U.S. Pat. No. 3,639,245 to Nelson wherein a dry toner powder having specific electric conductivity is disclosed. The toner of Nelson is formed by blending magnetite with the resin and then after blending pulverizing to a small particle size. The particles are then mixed with conductive carbon black which is imbedded in the surface of the particle and then a small particle size $SiO_2$ agent is mixed into the toner to improve the flowability. The toner of Nelson suffers the disadvantages that it does not transfer well from a photoconductive substrate to plain bond paper.

Therefore, there is a continuing need for magnetic toners suitable for use in one component magnetic development system. There is a need for toners suitable for high speed development that also have good electrostatic transfer characteristics for transfer from a photoconductive surface to plain bond paper. There is further a need for a magnetic pigment coating which aids field dependence without introducing undesirable properties such as humidity sensitivity into the toner. There is further a need for methods of rendering pigments hydrophobic and more easily dispersable in polymers.

There is a need for toners, which after they are transferred to paper, adhere sufficiently well by electrostatic forces that image disturbances (blur) do not readily occur on handling the unfused toner image prior to fixing.

In copending application Ser. No. 792,636, filed May 2, 1977, titled "Single Component Magnetic Toner" which is hereby incorporated by reference, it is disclosed that coating of magnetic pigments with fatty acids prior to mixing with resin and spray drying to form a toner will produce field dependence toner. However, there is a continuing need for additional field dependent toners.

There is also a need for coating magnetic pigments in the printing industry. There is a continuing need for pigment having hydrophobic characteristics such that it is suitable for use in multilith inks.

SUMMARY OF THE INVENTION

It is an object of this invention to provide a toner and coated pigment overcoming the above noted deficiencies.

It is a further object of this invention to provide a process of pigment and toner manufacture that overcomes the deficiencies of the above noted processes.

It is another object of this invention to produce clear sharp images by magnetic development without using a carrier.

It is a further object to produce pigment for a toner that will transfer electrostatically from the photoreceptor to plain bond paper.

It is another additional object to form a coated pigment that is hydrophobic.

It is a still further object to produce a coated pigment for toner whose electrical resistivity is field dependent.

It is another additional object to form toners that develop inductively from a magnetic brush and transfer electrostatically.

It is another object of this invention to provide coated pigments that will form toners that do not blur upon handling of unfused toner images.

It is still an additional object of this invention to form coated pigments by a simple process.

These and other objects of the invention are generally accomplished by coating magnetite or other magnetic particles with a polyacid derivative of maleic acid and an olefin. The coated magnetic particles then may be dispersed in a solvent resin solution and spray dried to form toners. Alternatively, the particles may be utilized for multilith inks.

In a specific embodiment in accordance with the invention, a polyanhydride which is a copolymer of octadecene-1 and maleic anhydride is converted first to water soluble disodium salt in an aqueous NaOH solution and then precipated as a polyacid onto magnetite in an aqueous HCl solution. The coated magnetite is washed and dried to recover the coated magnetite. The magnetite is then combined in a dispersion with toluene and polystyrene and spray dried to form toner.

DESCRIPTION OF THE INVENTION

The toner formed from the coated pigments of the instant invention generally have resistivity that is dependent on the strength of the electrical field. The field dependent resistivity change of these toners allows transfer processes without use of specially treated paper or transfer techniques such as pressure or use of adhesives. Further the toner is conductive at high fields so as to easily develop by inductive techniques.

The toners with the coated pigment of the instant invention have a resistivity of greater than about $10^{12}$ ohm-cm at low fields of about 10 volt/cm. It is preferred that the high resistivity of greater than about $10^{12}$ ohm-cm be maintained at least up to about 100 volt/cm field strength. The preferred initial resistivity is greater than $10^{14}$ ohm-cm as the range allows good development of the electrostatic image. The toners with the coated particles, of the invention, display a substantially stable resistivity as field strength increases and then have a break point where the resistivity rapidly decreases.

The magnetic pigments and toners of the instant invention are referred to as magnetic because they are attracted to a magnet. They are not themselves magnets. The toners are held to a magnetic brush roller or belt by magnetic forces. The mag brush is biased to induce a charge, opposite to that carried by the photoreceptor, onto the toner particles. Then the outer particles develop the latent electrostatic image as the electrostatic forces overcome the magnetic forces to deposit toner in the image areas. The earlier referenced U.S. Pat. No. 3,909,258 has illustrations of the forces present in the developing process utilizing a magnetic brush system without a carrier.

The magnetic pigment used to form the coated pigment of the invention may be any suitable particle which will give the desired magnetic and electrical properties in a toner subsequently formed. Typical of such materials are ferrites, iron particles and nickel alloys. Preferred for the instant process are magnetite particles as they are black in color, low cost and provide excellent magnetic properties. The magnetite particles may be of any shape and any size which results in a semiconductive particle with good transfer properties. Generally, the particle size is between 0.02 micron and about 1 micron. A preferred average particle size for the magnetite particles is about 0.1 to about 0.6 microns average particle size. The particles may be acicular or cubic shaped.

Any copolymer of maleic anhydride and an olefin that produces a hydrophobic coating on a magnetic particle may be utilized in the invention. Suitable copolymers are represented by a repeating unit of the general formula:

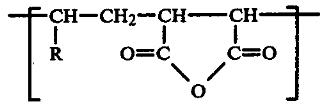

wherein R is an alkyl of between 6 and 22 carbon atoms. A preferred copolymer is of octadecene-1 and maleic anhydride to give good pigment coverage and hydrophobic properties.

The polyacid that precipitates onto the magnetic pigment has a repeating unit of the general formula

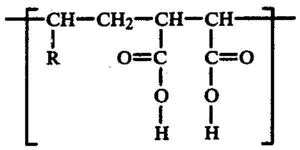

wherein R represents an alkyl group of between 6 and 22 carbon atoms.

The copolymer of maleic anhydride is generally dissolved and converted to a soluble salt by treatment in aqueous solution with a suitable base such as NaOH. An acid is then added to the aqueous solution to precipitate the polyacid onto the magnetic particle. Suitable acids include acetic acid. The preferred acid is HCl for complete precipitation and low impurity levels.

A suitable reaction is represented as follows:

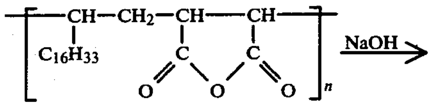

polyanhydride

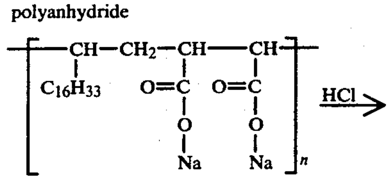

disodium salt of polyanhydride

-continued

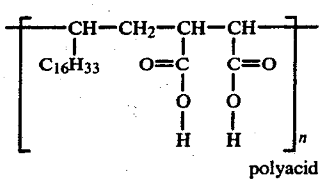

polyacid

The amount of polyacid coating may be any amount which gives the desired toner properties and hydrophobic pigment properties. A suitable coating range is about 1 to about 5 weight percent coating to pigment weight. The preferred coating is about 2 to about 3 weight percent of coating to magnetic pigment for complete coating with good hydrophobic properties at low cost.

While not wishing to be bound by any theory as to why the instant toners display their remarkable field dependent properties, it is believed that the properties are somehow related to the concentration of magnetic particles at the surface of the toner and that the coating of the magnetic pigment contributes to this higher concentration that results after spray drying. It is thought that the stability under humidity variance is related to the hydrophobic properties of the polyacid coating or to the covering of hydrophilic groups on the pigment particles.

The toner resins for use with the coated pigment of the invention may be selected from any suitable toner resin material that is compatible with the coating of the magnetite.

While any suitable transparent resin possessing the properties as above described may be employed in the system of the present invention, typical of such resins are polyamides, epoxies, polyurethanes, vinyl resins and polymeric esterification products of a dicarboxylic acid and a diol comprising a diphenol. Any suitable vinyl resin may be employed in the toners of the present system including homopolymers or copolymers of two or more vinyl monomers. Typical of such vinyl monomeric units includes: styrene; p-chlorostyrene; vinyl naphthalene; ethylenically unsaturated mono-olefins such as ethylene, propylene, butylene, isobutylene and the like; vinyl esters such as vinyl chloride, vinyl bromide, vinyl fluoride, vinyl acetate, vinyl propionate, vinyl benzoate, vinyl butyrate and the like; esters of alpha-methylene aliphatic monocarboxylic acids such as methyl acrylate, ethyl acrylate, n-butylacrylate, isobutyl acrylate, dodecyl acrylate, n-octyl acrylate, 2-chloroethyl acrylate, phenyl acrylate, methyl-alpha-chloroacrylate, methyl methacrylate, ethyl methacrylate, butyl methacrylate and the like; acrylonitrile, methacrylonitrile, acrylamide, vinyl ethers such as vinyl methyl ether, vinyl isobutyl ether, vinyl ethyl ether, and the like; vinyl ketones such as vinyl methyl ketone, vinyl hexyl ketone, methyl isopropenyl ketone and the like; vinylidene halides such as vinylidene chloride, vinylidene chlorofluoride and the like; and N-vinyl indole, N-vinyl pyrrolidene and the like; and mixtures thereof.

It is generally found that toner resins containing a relatively high percentage of styrene are preferred since greater image definition and density is obtained with their use. The styrene resin employed may be a homopolymer of styrene or styrene homologs of copolymers of styrene with other monomeric groups containing a single methylene group attached to a carbon atom by a double bond. Any of the above typical monomeric units may be copolymerized with styrene by additional polymerization. Styrene resins may also be formed by the polymerization of mixtures of two or more unsaturated monomeric materials with a styrene monomer. The addition polymerization technique employed embraces known polymerization technique such as free radical, anionic and cationic polymerization processes. Any of these vinyl resins may be blended with one or more other resins if desired, preferably other vinyl resins which insure good triboelectric properties and uniform resistance against physical degradation. However, non-vinyl type thermoplastic resins may also be employed including resin modified phenolformaldehyde resins, oil modified epoxy resins, polyurethane resins, cellulosic resins, polyether resins and mixtures thereof.

Polymeric esterification products of a dicarboxylic acid and a diol comprising a diphenol may also be used as a preferred resin material for the toner compositions of the instant invention. The diphenol reactant has the general formula:

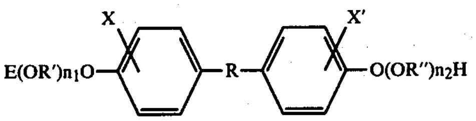

wherein R represents substituted and unsubstituted alkylene radicals having from 2 to 12 carbon atoms, alkylidene radicals having from 1 to 12 carbon atoms and cycloalkylidene radicals having from 3 to 12 carbon atoms; R' and R'' represent substituted and unsubstituted alkylene radicals having from 2 to 12 carbon atoms, alkylene arylene radicals having from 8 to 12 carbon atoms and arylene radicals; X and X' represents hydrogen or an alkyl radical having from 1 to 4 carbon atoms; and $n_1$ and $n_2$ are each at least 1 and the average sum of $n_1$ and $n_2$ is less than 21. Diphenols wherein R represents an alkylidene radical having from 2 to 4 carbon atoms and R' and R'' represents an alkylene radical having from 3 to 4 carbon atoms are preferred because greater blocking resistance, increased definition of xerographic characters and more complete transfer of toner images are achieved. Optimum results are obtained with diols in which R' is an isopropylidene radical and R' and R'' are selected from the group consisting of propylene and butylene radicals because the resins formed from these diols possess higher agglomeration resistance and penetrate extremely rapidly into paper receiving sheets under fusing conditions. Dicarboxylic acids having from 3 to 5 carbon atoms are preferred because the resulting toner resin possesses greater resistance to film formation on reusable imaging surfaces and resist the formation of fines under machine operation conditions. Preferred results are obtained with alpha unsaturated dicarboxylic acids including fumaric acid, maleic acid or maleic acid anhydride because maximum resistance to physical degradation of the toner as well as rapid melting properties are achieved. Any suitable diphenol which satisfies the above formula may be employed. Typical such diphenols include: 2,2-bis(4-beta hydroxy ethoxy phenyl)-propane, 2,2-bis(4-hydroxy isopropoxy phenyl) propane, 2,2-bis(4-beta hydroxy ethoxy phenyl) pentane, 2,2-bis(4-beta hydroxy ethoxy phenyl)-butane, 2,2-bis(4-hydroxy-propoxy-phenyl)-propane, 2,2-bis(4-hydroxy-propoxy-phenyl) propane, 1,1-bis(4-hydroxy-ethoxy-phenyl)-butane, 1,1-bis(4-hydroxy isopropoxy-phenyl) heptane, 2,2-bis(3-methyl-4-beta-hydroxy ethoxy-phenyl) propane, 1,1-bis(4-beta hydroxy ethoxy phenyl)-cyclohexane, 2,2'-bis(4-beta hydroxy ethoxy phenyl)-norbornane, 2,2'-bis(4-beta hydroxy ethoxy phenyl) norbornane, 2,2-bis(4-beta hydroxy styryl oxyphenyl) propane, the polyoxyethylene ether of isopropylidene diphenol in which both phenolic hydroxyl groups are oxyethylated and the average number of oxyethylene groups per mole is 2.6, the polyoxypropylene ether of 2-butylidene diphenol in which both the phenolic hydroxy groups are oxyalkylated and the average number of oxypropylene groups per mole is 2.5, and the like. Diphenols wherein R represents an alkylidene radical having from 2 to 4 carbon atoms and R' and R'' represent an alkylene radical having from 3 to 4 carbon atoms are preferred because greater blocking resistance, increased definition of xerographic characters and more complete transfer of toner images are achieved. Optimum results are obtained with diols in which R is isopropylidene and R' and R'' are selected from the group consisting of propylene and butylene because the resins formed from these diols possess higher agglomeration resistance and penetrate extremely rapidly into paper receiving sheets under fusing conditions.

Any suitable dicarboxylic acid may be reacted with a diol as described above to form the toner compositions of this invention either substituted or unsubstituted, saturated or unsaturated, having the general formula:

$$HOOC\ R'''_{n3}\ COOH$$

wherein R''' represents a substituted or unsubstituted alkylene radical having from 1 to 12 carbon atoms, arylene radicals or alkylene arylene radicals having from 10 to 12 carbon atoms and $n_3$ is less than 2. Typical such dicarboxylic acids including their existing anhydrides are: oxalic acid, malonic acid, succinic acid, glutaric acid, adipic acid, pimelic acid, suberic acid, azelaic acid, sebacic acid, phthalic acid, mesaconic acid, homophthalic acid, isophthalic acid, terephthalic acid, o-phenyleneacetic-beta-propionic acid, itaconic acid, maleic acid, maleic acid anhydride, fumaric acid, phthalic acid anhydride, traumatic acid, citraconic acid, and the like. Dicarboxylic acids having from 3 to 5 carbon atoms are preferred because the resulting toner resins possess greater resistance to film formation on reusable imaging surfaces and resist and formation of fines under machine operation conditions. Optimum results are obtained with alpha unsaturated dicarboxylic acids including fumaric acid, maleic acid, or maleic acid anhydride because maximum resistance to physical degradiation of the toner as well as rapid melting properties are achieved. The polymerization esterification products may themselves be copolymerized or blended with one or more other thermoplastic resins, preferably aromatic resins, aliphatic resins, or mixtures thereof. Typical thermoplastic resins include: resin modified phenol-formaldehyde resin, oil modified epoxy resins, polyurethane resins, cellulosic resins, vinyl type resins and mixtures thereof. When the resin component of the toner contains an added resin, the added component should be present in an amount less than about 50 percent by weight based on the total weight of the resin present in the toner. A relatively high percentage of the polymeric diol and dicarboxylic acid condensation product in the resinous component of the toner is preferred because a greater reduction of fusing temperatures is achieved with a given quantity of additive material. Further, sharper images and denser images are obtained when a high percentage of the polymeric diol and dicarboxylic acid condensation product is present in the toner. Any suitable blending technique may be employed to incorporate the added resin into the toner mixture. The resulting resin blend is substantially homogeneous and highly compatible with pigments and dyes. Where suitable, the colorant may be added prior to, simultaneously with or subsequent to the blending or polymerization step.

Optimum electrophotographic results are achieved with styrene-butyl methacrylate copolymers, styrene-vinyltoluene copolymers, styrene-acrylate copolymers, polystyrene resins, predominately styrene or polystyrene based resins as generally described in U.S. Reissue 25,136 to Carlson and polystyrene blends as described in U.S. Pat. No. 2,788,288 to Rheinfrank and Jones.

Any method of toner particle formation may be utilized with the coated particles of the instant invention which results in toner of the desired properties. The preferred method with the pigments of the instant invention is forming a solvent dispersion of the magnetite and toner resin and spray drying the dispersion as this results in toner particles having the magnetite concentrated on the surface and results in toner of good magnetic and electrical properties for excellent development and transfer to plain paper.

The solvent used for spray drying may be any material capable of dissolving the toner resin without adversely effecting the coating of the magnetite. Solvents for toner resins are well known including hydrocarbons, alcohols, ketones, esters, amides, fluorinated hydrocarbons, chlorinated hydrocarbons and other well known solvents. Preferred solvents are toluene for use with styrene polymer blends as this results in a toner that is solvent free and the solvent is low cost and relatively non-flammable. Chloroform has been found to be a preferred solvent for use with polyester type toner resins as it is readily available, non-flammable and results in a toner of low residual solvent. Both chloroform and toluene also are compatible with the preferred polyacid coating for the magnetite. The solvent is generally used in an amount such that the solids content of the solvent slurry 5–20% by weight. The term solids content is used here to indicate the solid resulting from spray drying which is the resin and magnetite plus any other additives to the toner such as colorants or triboelectric regulators.

Magnetite coated by the instant inventive process is of very low humidity sensitivity which is an advantage in the toner formation and further readily is dispersed in solvents and resins without effecting the properties of the coating.

While the above discussion has not included the addition of additives to the solvent prior to spray drying for inclusion in the toner, it is encompassed that additives such as dyes, pigments, dispersing agents, humidity sensitivity control materials may be added prior to toner formation. Suitable black colorants are carbon black pigments and nigrosine dyes. The preferred magnetite materials coated by the instant process are black and therefore suitable for the majority of electrophotographic reproduction uses without benefit of colorant additives. However, other less dark colored magnetic materials might require pigment or dye additives to obtain a suitable toner color. Such pigments and dyes are not needed to obtain the field dependency required of toners using the magnetite coated by the process of the invention.

While the above discussion has dealt primarily with magnetite pigments and their use in toners, the coating process and coated particles of the instant invention are also suitable for use in liquid inks and paints where low humidity sensitivity is an advantage. The coating process further may be used to coat pigments so that they do not react with the mediums that they color such as molding resins or powder coatings. Further, at high loadings of over about 80% the coated particles of the invention may be incorporated in suitable mediums for the formation of permanent magnets.

It is further contemplated that after treatment processes such as classification might be necessary depending on the particle size range achieved by the spray drying.

DESCRIPTION OF THE PREFERRED EMBODIMENTS

The following Examples further define, describe and compare methods of preparing developers of the instant invention and of utilizing them in electrophotographic applications. Parts and percentages are by weight unless otherwise indicated.

EXAMPLE I

A solution was formed of about 347 grams of deionized water, about 40 grams of bis[2-(2-methoxy-ethoxy) ethyl] ether and about 12.5 grams of saturated NaOH. About 50 grams of a copolymer of maleic anhydride and octadecene-1 available as PA-18 a polyanhydride of Gulf Chemical Co. was added to the solution with stirring. The mixture was heated to 85° C. and maintained at this temperature for 1 hour with stirring. The mixture was cooled to about 30°–40° C. and 500 ml. of methanol was added. The mixture was filtered, washed and dried. The material obtained was a disodium salt of the copolymer. The ether was utilized in the original solution as the copolymer is not sufficiently soluble in water alone.

Five grams of the dried disodium salt was dissolved in 400 grams of deionized water at 80°–85° C. 200 grams of Pfizer magnetite MO-4232 was added to the solution with vigorous stirring. The temperature of the slurry was kept at about 85° C. for 30 minutes. A dilute hydrochloric acid (2.5 grams conc HCl and 15 grams $H_2O$) was added dropwise to the slurry with stirring. The stirring was continued for 10 minutes. The mixture was filtered, washed, and dried at about 100° C. for 16 hours. The clumps were broken up with a spatula. The magnetite was not wetted by water indicating it is hydrophobic.

A toner was prepared by spray drying a dispersion formed by dissolving about 200 grams of 65/35 styrene-n-butylmethacrylate in about 2,000 grams of toluene and then dispersing the above prepared coated magnetite into the solvent solution. A Bowen spray dryer with a feed rate of about 200 milliliters per minute and a feed temperature of between about 180° F. and 220° F. is utilized. The powder resistivity of this toner is $10^{16}$ ohm-cm at field strengths of up to 20 K volt/cm. The toner was utilized in an induction magnetic development system without a carrier of a Mita Copystar 700D copier using ZnO paper and was found to produce images of good quality with low background. The toner by separate test also is found to transfer well electrostatically to plain bond paper. The ability of the toner to develop in an inductive magnetic brush system indicates that the toner is conductive at high field strengths and, therefore, field dependent.

EXAMPLE II

The process of Example I is repeated except 4 grams of the disodium salt are used. The toner displays good development and transfer properties similar to Example I.

EXAMPLE III

The process of Example I is repeated except 200 grams of Picoelastic D-125, a polystyrene resin, is substituted for the styrene butylmethacrylate resin and about 6 grams of disodium salt are utilized. The toner demonstrates good development and transfer properties.

EXAMPLE IV

The process of Example I is repeated substituting about 200 grams of Cities Service Mapico Black magnetite, a cubic magnetite as the magnetite and 6 grams of disodium salt. The print quality and transfer efficiency is excellent. The initial resistivity at low field is about $10^{15}$ ohm-cm.

EXAMPLE V

The process of Example I is repeated substituting about 230 grams of 65/35 styrene-butylmethacrylate resin as the resin, about 260 grams of Cities Service Mapico Black as the magnetite and about 6 grams of the disodium salt. The toner has excellent transfer and development characteristics.

The resistivity measurements for toner used throughout this application are determined by the following process. Measurements on powder are complicated by the fact that the results are influenced by characteristics of the powder particles, shape and size in addition to powder composition. Therefore, measurements were obtained on powder rather than by molding the powder into a pellet specimen in order to better relate the properties to the toner behavior in development. The measurements were made using a two inch diameter electrode of a Balsbaugh cell for measuring the direct current resistivity of the toner. The gap distance is 0.05 inch. The toner is packed between the electrodes of the cell by vibration until a constant bed volume is reached. The current is measured as a function of applied voltage at the 50 mil gap. The electrification time is 1 minute as recommended by ASTM method. After each measurement, the sample is repacked by vibration. Resistivity is calculated according to Ohms law.

Although specific materials and conditions were set forth in the above exemplary processes in the formation and using the toner of the invention, these are merely intended as illustrations of the present invention. Various other substituents and processes such as those listed above may be substituted for those in the examples with similar results. In addition to the steps used by the coating of the present invention, other steps or modifications may be used. For instance, the pigment could be classified or separated by other filtering methods. In addition, other materials, such as colorants, could be added.

The coated magnetic pigment of the invention may be utilized in any amount that forms a magnetic field dependent toner. A suitable range has been found to be a magnetic pigment content between about 40 and about 70 weight percent of coated magnetic particle in the finished toner. A preferred range is a coated magnetite content between about 45 and 55 weight percent of coated magnetite for good magnetic development properties and good transfer.

Other modifications of the present invention will occur to those skilled in the art upon reading the present disclosure. These are intended to be included within the scope of this invention. For instance, the coated magnetic particles of this invention could be utilized in formation of permanent magnets or in a paint as a magnetic coating. Further, the coating method could be used to treat colored pigments for toner use to reduce humidity sensitivity.

What is claimed is:

1. A process of coating particles comprising forming an aqueous dispersion of magnetic particles in a solution of a water soluble salt of a polyanhydride in water, converting the soluble salt of the polyanhydride to the polyacid by adding acid to said aqueous dispersion to precipitate the polyacid onto said magnetic particles and separating the coated magnetic particles from the aqueous dispersion.

2. The process of claim 1 wherein the polyanhydride is a copolymer comprising the following repeating unit

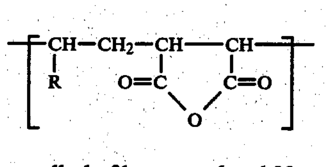

wherein R is an alkyl of between 6 and 22 carbon atoms.

3. The process of claim 2 wherein R consists of $C_{16}H_{33}$.

4. The process of claim 1 wherein said magnetic particles are magnetite.

5. The process of claim 1 wherein the coating comprises about 1 to about 5 percent by weight of said coated magnetic particles.

6. The process of claim 1 wherein the coating comprises about 2 to about 3 weight percent of said coated magnetic particles.

7. The process of claim 1 wherein said polyacid comprises a polymer having the repeating unit

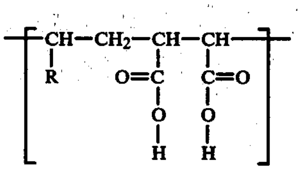

wherein R is an alkyl of between 6 and 22 carbon atoms.

8. A method of toner formation comprising forming an aqueous dispersion of magnetic particles in a solution of a water soluble salt of a polyanhydride in water, converting the soluble salt of the polyanhydride to the polyacid by adding acid to said aqueous dispersion to precipitate the polyacid onto said magnetic particles, separating the coated magnetic particles from the aqueous dispersion, mixing said coated particles into a solution of a solvent and resin to form a slurry and spray drying said slurry to form toner.

9. The method of claim 8 wherein the polyanhydride comprises the following repeating unit

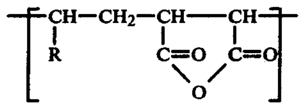

wherein R is an alkyl of between 6 and 22 carbon atoms.

10. The method of claim 9 wherein R consists of $C_{16}H_{33}$.

11. The method of claim 8 wherein said magnetic particles are magnetite.

12. The method of claim 8 wherein the coating comprises about 1 to about 5 percent by weight of said coated magnetic particles.

13. The method of claim 8 wherein the coating comprises about 2 to about 3 weight percent of said coated magnetic particles.

14. The method of claim 8 wherein said polyacid comprises a polymer having the repeating unit

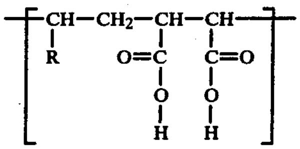

wherein R is an alkyl of between 6 and 22 carbon atoms.

15. The process of claim 1 wherein said polyanhydride comprises a copolymer of maleic anhydride and an olefin.

16. The process of claim 1 wherein the polyanhydride is converted to the soluble salt thereof prior to the addition of the magnetic particles.

17. The process of claim 16 wherein the soluble salt is the sodium salt.

* * * * *